US008985143B2

United States Patent
Forte, Jr. et al.

(10) Patent No.: US 8,985,143 B2
(45) Date of Patent: Mar. 24, 2015

(54) APPARATUS FOR MONITORING OF VALVES AND METHOD OF OPERATING THE SAME

(75) Inventors: Guido Felice Forte, Jr., Rensselaer, NY (US); David Ernest Welch, Amsterdam, NY (US); Edward Leo Kudlacik, Glenville, NY (US)

(73) Assignee: General ELectric Company, Schenectady, NY (US)

( * ) Notice: Subject to any disclaimer, the term of this patent is extended or adjusted under 35 U.S.C. 154(b) by 344 days.

(21) Appl. No.: 13/566,055

(22) Filed: Aug. 3, 2012

(65) Prior Publication Data
US 2014/0034158 A1 Feb. 6, 2014

(51) Int. Cl.
| E03B 7/07 | (2006.01) |
| F01D 17/02 | (2006.01) |
| F01D 21/00 | (2006.01) |
| F01D 21/14 | (2006.01) |
| F16K 1/12 | (2006.01) |
| F16K 37/00 | (2006.01) |
| F16K 41/00 | (2006.01) |
| G01M 3/28 | (2006.01) |

(52) U.S. Cl.
CPC .............. *F01D 17/02* (2013.01); *F01D 21/003* (2013.01); *F01D 21/14* (2013.01); *F16K 1/12* (2013.01); *F16K 37/005* (2013.01); *F16K 41/00* (2013.01); *G01M 3/2876* (2013.01)
USPC ......................................... 137/557; 251/210

(58) Field of Classification Search
CPC .................................................... F01D 17/145
USPC .......... 137/312, 557; 251/210; 73/40.5 R, 40, 73/46
See application file for complete search history.

(56) References Cited

U.S. PATENT DOCUMENTS

| 3,141,685 | A | * | 7/1964 | Watts ............................. 285/93 |
| 3,892,382 | A | * | 7/1975 | Dresner ......................... 251/28 |
| 4,019,371 | A | * | 4/1977 | Chaplin et al. .................... 73/46 |
| 4,410,186 | A | * | 10/1983 | Pierce, Jr. ..................... 277/318 |
| 4,615,734 | A | | 10/1986 | Spriggs |
| 4,704,336 | A | | 11/1987 | Spriggs |
| 4,726,813 | A | | 2/1988 | Viscovich |
| 4,776,765 | A | | 10/1988 | Summer et al. |

(Continued)

FOREIGN PATENT DOCUMENTS

| EP | 1217352 A1 | 6/2002 |
| EP | 0887581 B1 | 11/2002 |

OTHER PUBLICATIONS

International Search Report and Written Opinion, dated Nov. 8, 2013, for co-pending International Application No. PCT/US2013/053137.

*Primary Examiner* — Craig Schneider
*Assistant Examiner* — Angelisa Hicks
(74) *Attorney, Agent, or Firm* — Armstrong Teasdale LLP

(57) ABSTRACT

A valve includes a valve stem assembly including at least one wall and at least one passage at least partially defined within the valve stem assembly. The at least one passage defines a first opening. At least one portion of the at least one wall defines an erosion site that is configured to undergo contact with solid particles such that a second opening of the passage is defined. The valve also includes at least one sensing device coupled in flow communication with the at least one passage through the first opening. The at least one sensing device is configured to transmit a signal representative of an increased fluid flow through the at least one passage.

16 Claims, 5 Drawing Sheets

(56) References Cited

U.S. PATENT DOCUMENTS

| | | | |
|---|---|---|---|
| 4,874,007 A * | 10/1989 | Taylor | 137/312 |
| 4,986,309 A | 1/1991 | Bellanca | |
| 5,683,226 A | 11/1997 | Clark et al. | |
| 6,299,216 B1 * | 10/2001 | Thompson | 285/93 |
| 6,763,703 B2 | 7/2004 | Krieger et al. | |
| 7,296,964 B2 | 11/2007 | Montgomery | |
| 7,571,057 B2 | 8/2009 | D'Amato et al. | |
| 2007/0068225 A1 * | 3/2007 | Brown | 73/40.5 A |
| 2009/0123737 A1 | 5/2009 | Yasui et al. | |
| 2011/0006241 A1 | 1/2011 | Wilke | |

* cited by examiner

APPARATUS FOR MONITORING OF VALVES AND METHOD OF OPERATING THE SAME

BACKGROUND OF THE INVENTION

The embodiments described herein relate generally to fluid systems and, more particularly, to methods and apparatus that facilitate erosion detection of valves in steam systems.

At least some steam turbines are coupled to steam generators that include at least one fossil fuel-fired boiler and/or at least one heat recovery steam generator (HRSG). Boilers and HRSGs include tubing that converts water to steam. The steam turbine is coupled to the boiler/HRSG via steam piping. Some known steam turbines include steam turbine inlet isolation valves and steam turbine control valves. Such isolation and control valves may be combined into a single valve assembly. Steam is channeled to the steam turbine via a steam transport system that includes the steam piping, isolation valves, and control valves.

Many known steam piping systems between the steam boilers and HRSGs include metallic piping and the tubing in the boilers and HRSGs is also metallic. The metallic, e.g., ferrous, piping and tubing is subject to exfoliation of solid particles, e.g., magnetite, from the interior walls of the piping and tubing into and through the steam transport system. The solid particles become entrained within the steam channeled from the boilers/HRSGs to the steam turbine and impact the components in the steam transport path, thereby introducing an erosion mechanism to those components, wherein the mechanism is typically referred to as solid particle erosion. Over time, solid particle erosion may induce accelerated wear of steam turbine components, including steam valves, e.g., valve stems. Increased wear of steam valve stems due to solid particle erosion results in a decrease of plant efficiency, and extended wear may result in lower reliability and availability due to an increased frequency of steam turbine outages to inspect and/or repair the steam valves. Moreover, most known inspection procedures require physical disassembly of the steam valves to visually inspect the stem for material losses due to erosion. The decrease in turbine performance and the increase in maintenance activities result in an increase in operating costs.

BRIEF DESCRIPTION OF THE INVENTION

In one aspect, a valve is provided. The valve includes a valve stem assembly including at least one wall and at least one passage at least partially defined within the valve stem assembly. The at least one passage defines a first opening. At least one portion of the at least one wall defines an erosion site that is configured to undergo contact with solid particles such that a second opening of the passage is defined. The valve also includes at least one sensing device coupled in flow communication with the at least one passage through the first opening. The at least one sensing device is configured to transmit a signal representative of an increased fluid flow through the at least one passage.

In another aspect, a fluid system is provided. The fluid system includes at least one fluid source and at least one valve coupled in flow communication with the at least one fluid source. The at least one valve includes a valve stem assembly including at least one wall and a valve monitoring system that includes at least a portion of the at least one wall. The valve monitoring system also includes at least one passage at least partially defined within the valve stem assembly. The at least one passage defines a first opening. The valve monitoring system further includes at least one sensing device coupled in flow communication with the at least one passage through the first opening. The at least one sensing device is configured to transmit a signal representative of an increased fluid flow through the at least one passage. The at least a portion of the at least one wall defines an erosion site that is configured to undergo contact with solid particles such that a second opening of the passage is defined.

In yet another aspect, a method of operating a fluid system is provided. The method includes channeling a fluid from a fluid source to a valve. The fluid includes entrained particles. The valve includes a valve stem assembly. The method also includes impinging the fluid with the entrained particles against at least a portion of the valve stem assembly. The method further includes eroding the at least a portion of the valve stem assembly and exposing a passage that extends through the valve stem assembly to the fluid. The method also includes channeling a portion of the fluid through the passage and contacting a sensing device. The method further includes transmitting a signal from the sensing device representative of increased fluid flow through the passage.

DETAILED DESCRIPTION OF THE INVENTION

Figure 1:
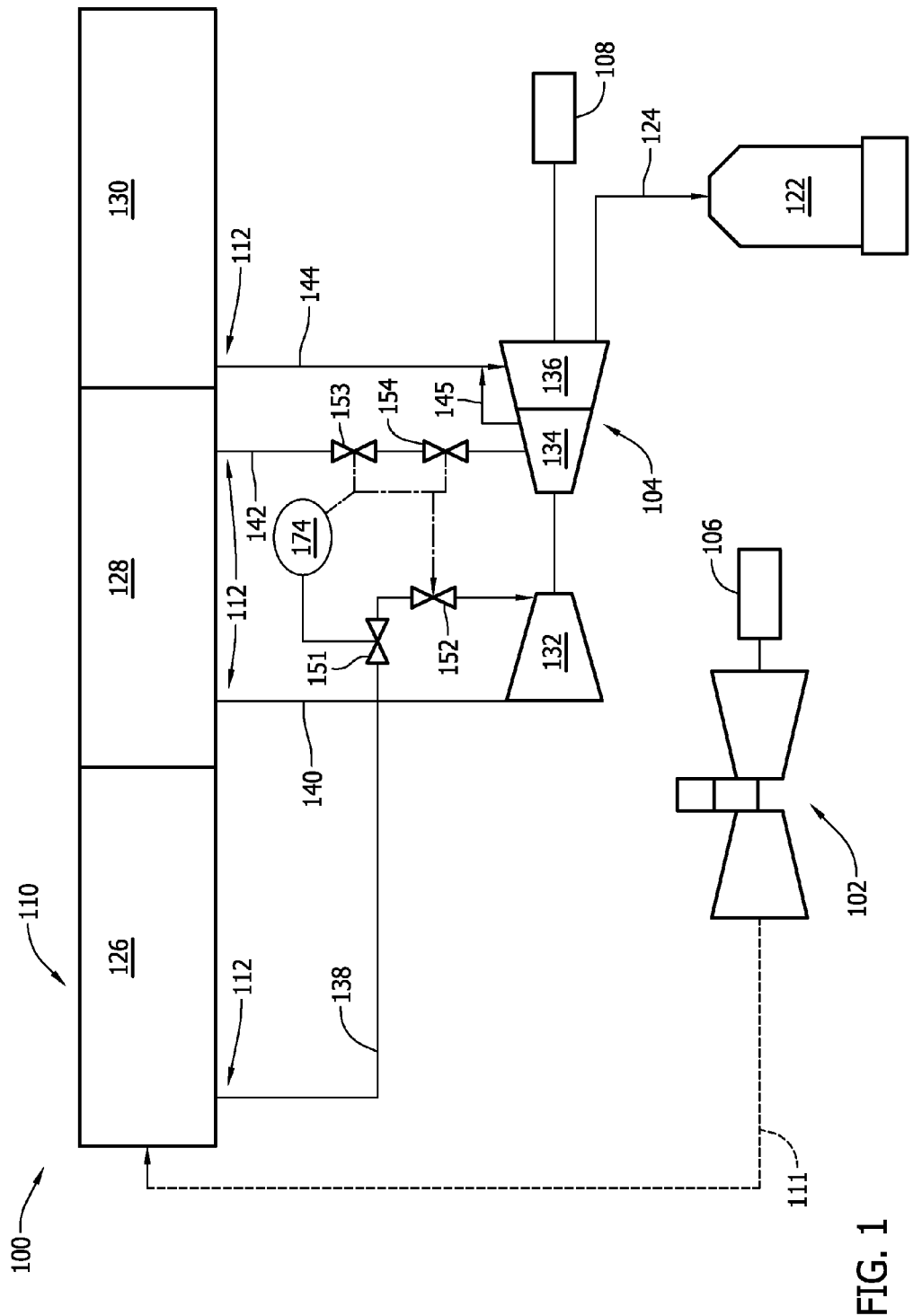
FIG. 1 is a schematic view of an exemplary combined cycle power system.

FIG. 1 is a schematic illustration of an exemplary electric power generation facility that, in the exemplary embodiment, is a combined cycle power system 100. System 100 includes a gas turbine 102 and a steam turbine 104 rotatably coupled to a first electric power generator 106 and a second electric power 108, respectively. System 100 also includes a heat recovery steam generator (HRSG) 110 coupled in flow communication with gas turbine 102 via an exhaust gas conduit 111. Alternatively, the electric power generation facility may include any steam generation devices coupled to steam turbine 104, including, without limitation, a fossil fuel-fired utility boiler and a nuclear steam generation complex.

In the exemplary embodiment, a single gas turbine 102 is coupled to a single HRSG 110 that is coupled to a single steam turbine 104. Alternatively, a plurality of gas turbines 102 are coupled to a plurality of HRSGs 110 that are coupled to a single steam turbine 104. Also, alternatively, combined cycle power system 100 includes any number of gas turbines 102, any number of HRSGs 110, and any number of steam turbines 104 that enable operation of system 100 as described herein.

In the exemplary embodiment, steam turbine 104 is coupled in flow communication with HRSG 110 via multiple steam conduits 112. As used herein, steam conduits 112 include piping and/or tubing of any material and of any gauge that enables operation of system 100 as described herein.

Steam turbine 104 is also coupled in flow communication with a condenser 122 via a low pressure steam exhaust conduit 124. In the exemplary embodiment, HRSG 110 includes a high pressure (HP) superheater section 126, a reheater/intermediate pressure (RH/IP) section 128, and a low pressure (LP) section 130. Similarly, steam turbine 104 includes an HP section 132, an IP section 134, and a LP section 136. In the exemplary embodiment, steam conduits 112 include an HP superheated steam conduit 138 that couples HP superheater section 126 in flow communication with HP section 132. Steam conduits 112 also include a cold reheat (CRH) steam conduit 140 that couples HP section 132 in flow communication with RH/IP section 128. Steam conduits 112 further include a hot reheat (HRH) steam conduit 142 that couples RH/IP section 128 in flow communication with IP section 134. Steam conduits 112 also include an LP steam conduit 144 that couples LP section 130 in flow communication with LP section 136. Moreover, steam turbine 104 includes a steam cross-over conduit 145 coupling IP section 134 in flow communication with LP section 136.

Combined cycle power system 100 further includes a main control valve (MCV) 151 and a main stop valve (MSV) 152 positioned in HP superheated steam conduit 138 just upstream of HP section 132. System 100 also includes an intermediate control valve (ICV) 153 and an intermediate stop valve (ISV) 154 positioned in HRH steam conduit 142 just upstream of IP section 134. System 100 further includes an HP bypass valve 156 positioned within HP bypass conduit 148, and an IP bypass valve 158 positioned within IP bypass conduit 150. While MSV 152 and MCV 151 are schematically shown as two independent valves, MSV 152 and MCV 151 are positioned within a common valve body (not shown in FIG. 1). Similarly, while ISV 154 and ICV 153 are schematically shown as two independent valves, ISV 154 and ICV 153 are positioned within a common valve body (not shown in FIG. 1). Alternatively, MSV 152, MCV 151, ISV 154, and ICV 153 are independent valves spaced apart from each other a predetermined distance in their associated steam piping runs.

Also, in the exemplary embodiment, combined cycle power system 100 includes a controller 174 operatively coupled to MSV 152, MCV 151, ISV 154, and ICV 153. Alternatively, combined cycle power system 100 may include any number of controllers operatively coupled to any valves that enable operation of combined cycle power system 100 as described herein. Controller 174 facilitates operative control features of MSV 152, MCV 151, ISV 154, and ICV 153 via features that include, without limitation, receiving permissive inputs, transmitting permissive outputs, and transmitting opening and closing commands.

Moreover, in the exemplary embodiment, controller 174 includes and/or is implemented by at least one processor (not shown). As used herein, the processor includes any suitable programmable circuit such as, without limitation, one or more systems and microcontrollers, microprocessors, a general purpose central processing unit (CPU), reduced instruction set circuits (RISC), application specific integrated circuits (ASIC), programmable logic circuits (PLC), field programmable gate arrays (FPGA), and/or any other circuit capable of executing the functions described herein. The above examples are exemplary only, and thus are not intended to limit in any way the definition and/or meaning of the term "processor."

In addition, controller 174 includes at least one memory device (not shown) coupled to the processor that stores computer-executable instructions and data, such as operating data, parameters, setpoints, threshold values, and/or any other data that enables combined cycle power system 100 to function as described herein. The memory device may include one or more tangible, non-transitory, computer readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory.

The methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, such as a firmware, physical and virtual storage, CD-ROMs, DVDs and another digital sources such as a network or the Internet, as well as yet to be developed digital means, with the sole exception being a transitory, propagating signal.

Figure 2:
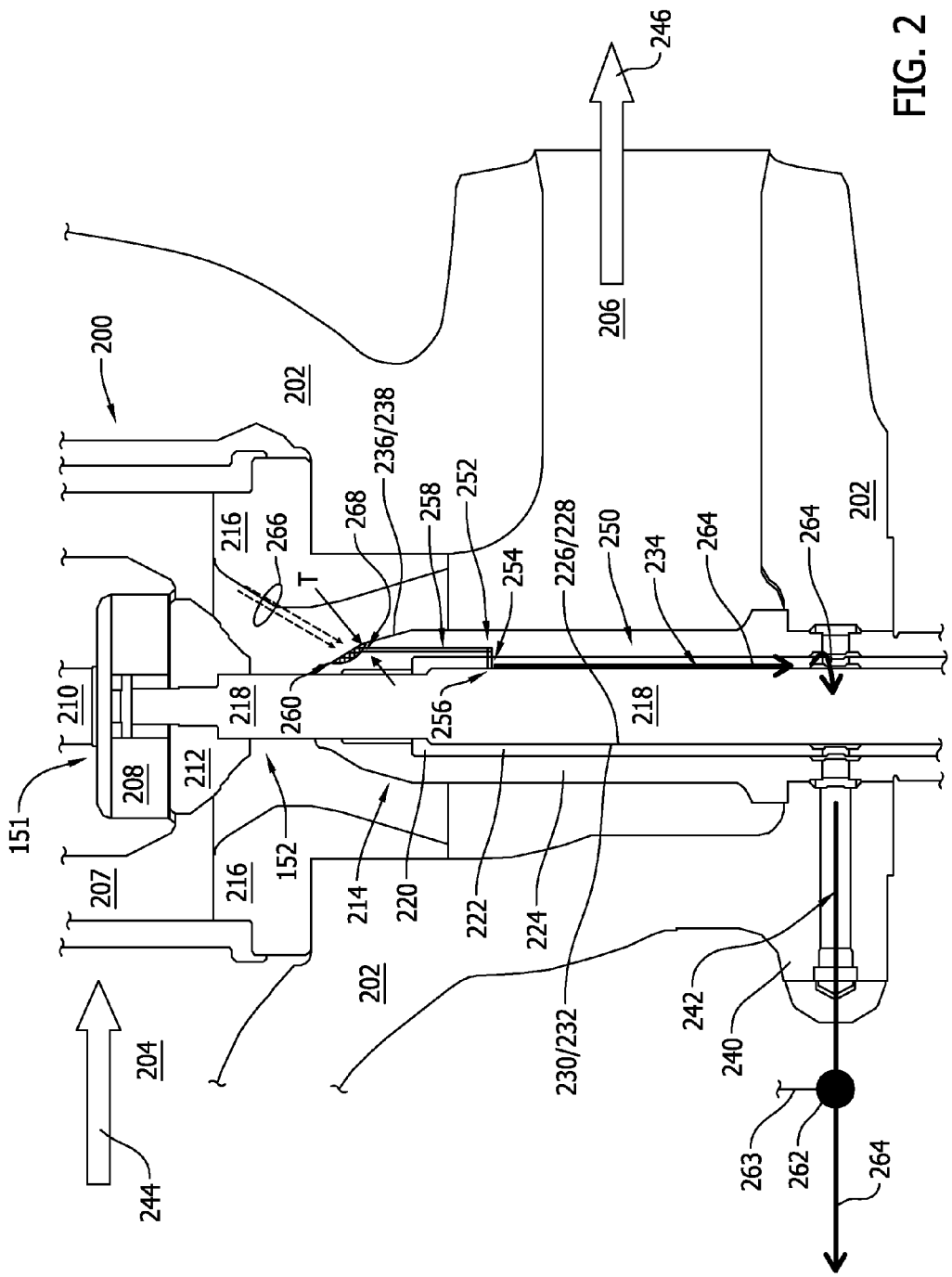
FIG. 2 is a schematic view of an exemplary combined steam turbine stop and control valve with an exemplary valve monitoring system.

FIG. 2 is a schematic view of an exemplary combined steam turbine stop and control valve 200 with an exemplary valve monitoring system 250. In the exemplary embodiment, combined turbine stop and control valve 200 includes a unitary valve body 202. Valve body 202 defines a steam inlet 204 coupled to HP superheated steam conduit 138 (shown in FIG. 1) and also defines a steam outlet 206 coupled to steam turbine HP section 132 (shown in FIG. 1). Valve 200 also includes and inlet steam strainer 207 positioned downstream of steam inlet 204.

Also, in the exemplary embodiment, combined steam turbine stop and control valve 200 includes MCV 151 and MSV 152. MCV 151 includes a control valve disc 208 coupled to a control valve stem 210. MSV 152 includes a stop valve plug 212 and a stop valve stem assembly 214. MCV 151 and MSV 152 share a valve seat 216.

Alternatively, combined steam turbine stop and control valve 200 may include ICV 153 and ISV 154 wherein steam inlet 204 is coupled to HRH steam conduit 142 (shown in FIG. 1) and steam outlet 206 is coupled to steam turbine IP section 134 (shown in FIG. 1). Also, alternatively, combined stop and control valve 200 may be used in any fluid system with a potential for entrained particles that enables operation of valve monitoring system 250 as described herein, including, without limitation, gas and liquid transport systems.

Further, in the exemplary embodiment, stop valve stem assembly 214 includes a valve stem 218 and a back-seating ring 220 coupled to valve stem 218. Stop valve stem assembly 214 also includes a bushing 222 coupled to valve stem 218 and back-seating ring 220, wherein bushing 222 extends about valve stem 218. Stop valve stem assembly 214 further includes a shroud device, i.e., a pressure seal head 224 coupled to and extending about back-seating ring 220, bushing 222, and valve stem 218. Valve stem 218 includes a valve stem wall 226 that defines a valve stem wall outer surface 228. Bushing 222 includes a bushing wall 230 that defines a bushing wall inner surface 232 that opposes valve stem outer surface 228. Valve stem wall outer surface 228 and bushing wall inner surface 232 define a steam passage 234 therebetween. Pressure seal head 224 includes a pressure seal head wall 236 that defines a pressure seal head wall outer surface 238.

In some alternative embodiments, combined steam turbine stop and control valve 200 does not include a bushing 222. In such embodiments, pressure seal head 224 is radially extended toward valve stem outer surface 228 to define steam passage 234 therebetween.

Moreover, in the exemplary embodiment, combined steam turbine stop and control valve 200 includes a stem leak-off device 240 that defines a steam leak-off passage 242 therein.

In operation, combined steam turbine stop and control valve 200 control flow of inlet steam 244 from HP superheated steam conduit 138 and outlet steam 246 to steam turbine HP section 132 through valve body 202. Stop valve stem assembly 214 is moved upward to open MSV 152 by moving stop valve plug 212 away from valve seat 216. MSV 152 is closed by moving stop valve plug 212 downward until it contacts valve seat 216. MSV 152 is either fully open or fully closed and is not used to regulate steam flow. In contrast, steam flow through MCV 151 is regulated by modulating the position of control valve disc 208 with respect to valve seat 216 via control valve stem 210. Controller 174 directs operation of MSV 152 and MCV 151 through devices that include, without limitation, electric drive motors and electro-hydraulic mechanisms (not shown).

In the exemplary embodiment, valve monitoring system 250 includes a machined passage 252. Specifically, a first portion 254 of passage 252 is drilled through bushing wall 230 and partially into pressure seal head 224. Passage 252 defines a first opening 256 on bushing wall inner surface 232. A second portion 258 of passage 252 is drilled through pressure seal head 224. First portion 254 and second portion 258 are coupled in flow communication and are oriented substantially orthogonal to each other. Alternatively, first portion 254 and second portion 258 may have any orientation within stop valve stem assembly 214 and to each other that enables operation of valve monitoring system 250 as described herein. Also, machined passage 252 has any interior dimensions, e.g., without limitation, lengths and diameters, that enable operation of valve monitoring system 250 as described herein.

Second portion 258 of passage 252 is drilled such that a predetermined thickness T of pressure seal head wall 236 between pressure seal head wall outer surface 238 and second portion 258 of passage 252 is maintained. Alternatively, second portion 258 may be drilled to extend through pressure seal head wall 236 to outer surface 238 and material is replaced to close wall 236 and define thickness T within wall 236 via methods that include, without limitation, brazing, seal-welding, and plug insertion. Proximate to second portion 258 of passage 252 is a predetermined erosion site 260, wherein thickness T has any value that enables operation of valve monitoring system 250 as described herein. Erosion site 260 is oriented and configured to erode within a predetermined range of erosion rates for a predetermined range of solid particle concentrations in the fluid channeled through combined steam turbine stop and control valve 200.

Also, in the exemplary embodiment, first portion 254 of machined passage 252 is coupled in flow communication with steam passage 234 via first opening 256. Steam passage 234 is coupled in flow communication with steam leak-off passage 242, wherein passages 234 and 242 are included within valve monitoring system 250. Passages 234 and 242 have any interior dimensions, e.g., without limitation, lengths and diameters, that enable operation of valve monitoring system 250 as described herein.

Further, in the exemplary embodiment, valve monitoring system 250 includes a sensing device 262 that is at least one of a pressure sensor, a flow sensor, and any other type of sensor that enables operation of valve monitoring system 250 as described herein. Sensing device 262 is coupled to a processing device, e.g., controller 174 (shown in FIG. 1) via a channel 263 to facilitate monitoring steam leakage 264 between valve stem 218 and bushing 222.

In operation, stop valve stem assembly 214 is moved upward to open MSV 152 by moving stop valve plug 212 away from valve seat 216 until MSV 152 is back-seated, i.e., in the fully open condition. Valve stem 218 is firmly seated against back-seating ring 220 such that there is substantially no steam flow through steam passage 234 and steam leak-off passage 242 being detected by sensing device 262. Upon initial commissioning of combined steam turbine stop and control valve 200, erosion site 260 is substantially in a factory "as-built" condition with predetermined thickness T and with substantially no accumulated erosion.

As inlet steam 244 is channeled through MCV 151 and MSV 152, entrained materials that include magnetite particles 266 exfoliated from HP superheater section 126 of HRSG 110 and HP superheated steam conduit 138 (all shown in FIG. 1) have a predetermined particle trajectory toward erosion site 260. As particles 266 contact, i.e., impact and impinge erosion site 260, material is eroded from pressure seal head wall outer surface 238 at site 260, thereby decreasing the value of thickness T. Once sufficient material is removed such that the value of thickness T approaches zero, a second opening 268 is defined at second portion 258 of machined passage 252 at erosion site 260. Machined passage 252 is pressurized with steam and steam leakage 264 is channeled to sensing device 262 through second opening 268, machined passage 252, first opening 256, steam passage 234, and steam leak-off passage 242. A signal (not shown) representative of an increase in steam flow 264 through stem leak-off device 240 is transmitted through channel 263 such that an alarm and/or warning indication (not shown) is annunciated to an operator (not shown). Therefore, a maintenance work order to inspect and/or repair combined steam turbine stop and control valve 200 may be generated.

Figure 3:
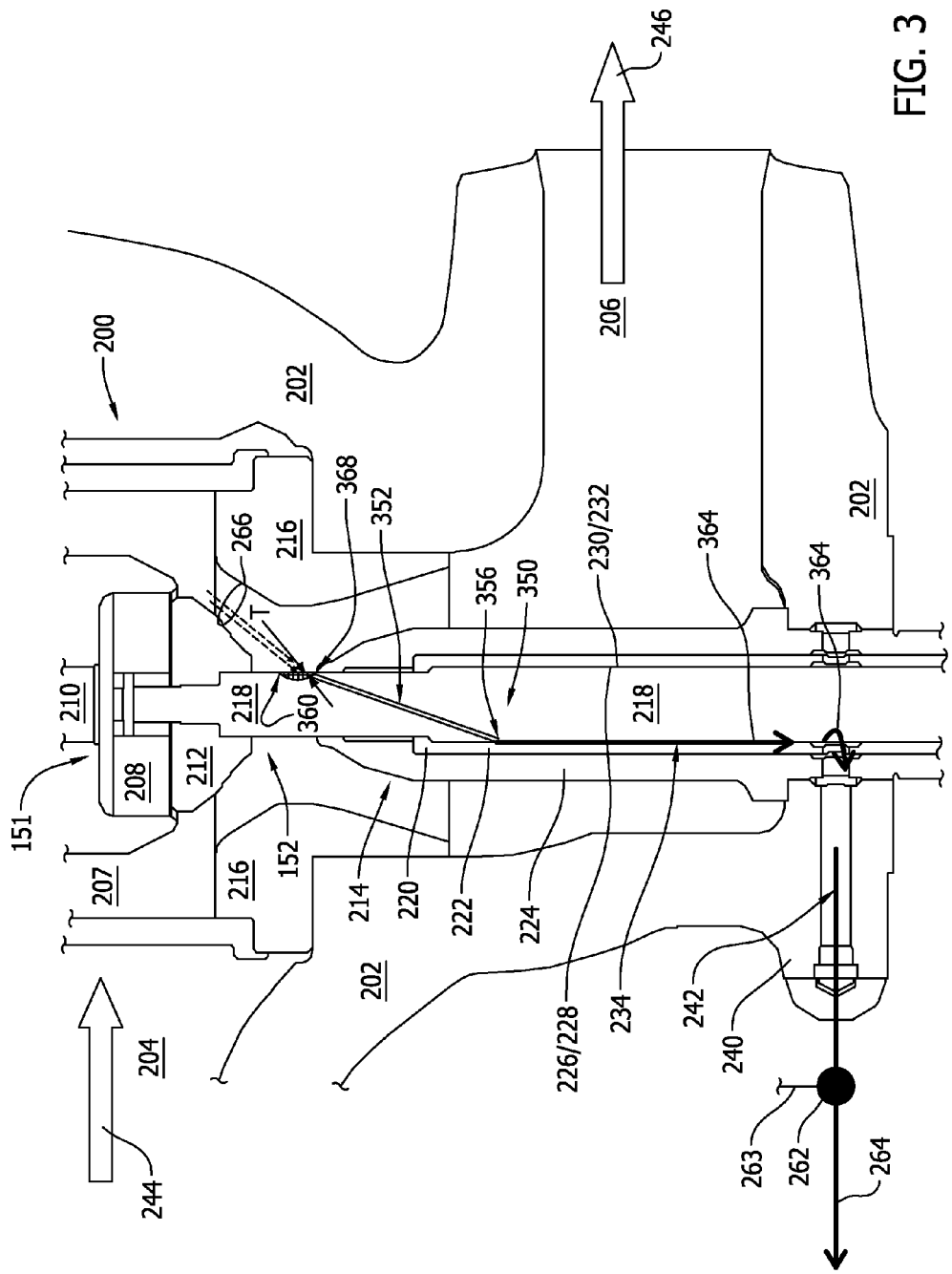
FIG. 3 is a schematic view of the combined steam turbine stop and control valve shown in FIG. 2 with an exemplary alternative valve monitoring system.

FIG. 3 is a schematic view of combined steam turbine stop and control valve 200 with an exemplary alternative valve monitoring system 350. In some alternative embodiments, combined steam turbine stop and control valve 200 does not include a bushing 222. In such embodiments, pressure seal head 224 is radially extended toward valve stem outer surface 228 to define steam passage 234 therebetween.

System 350 is similar to system 250 (shown in FIG. 2) with the exception that system 350 has an alternative machined passage 352. In this alternative exemplary embodiment, passage 352 defines a first opening 356 coupling passage 352 to steam passage 234. Passage 352 also defines a second opening 368 proximate to an alternative erosion site 360, wherein erosion site 360 is positioned on valve stem wall outer surface 228. In the exemplary embodiment, first opening 356 and second opening 368 are positioned 180° apart from each other on valve stem wall outer surface 228. Alternatively, machined passage 352, first opening 356, and second opening 368, have any orientation within stop valve stem assembly 214 and to each other that enables operation of valve monitoring system 350 as described herein.

Machined passage 352 is drilled such that a predetermined thickness T of valve stem wall outer surface 228 is maintained. Alternatively, machined passage 352 may be drilled to extend through outer surface 228 of valve stem 218 to define second opening 368 and material is replaced to close second opening 368 and define thickness T within outer surface 228 via methods that include, without limitation, brazing, seal-welding, and plug insertion. Thickness T has any value that enables operation of valve monitoring system 350 as described herein. Erosion site 360 is oriented and configured to erode within a predetermined range of erosion rates for a predetermined range of solid particle concentrations in the fluid channeled through combined steam turbine stop and control valve 200. Also, machined passage 352 has any interior dimensions, e.g., without limitation, lengths and diameters, that enable operation of valve monitoring system 350 as described herein. Operation of valve monitoring system 350 is similar to operation of system 250.

Figure 4:
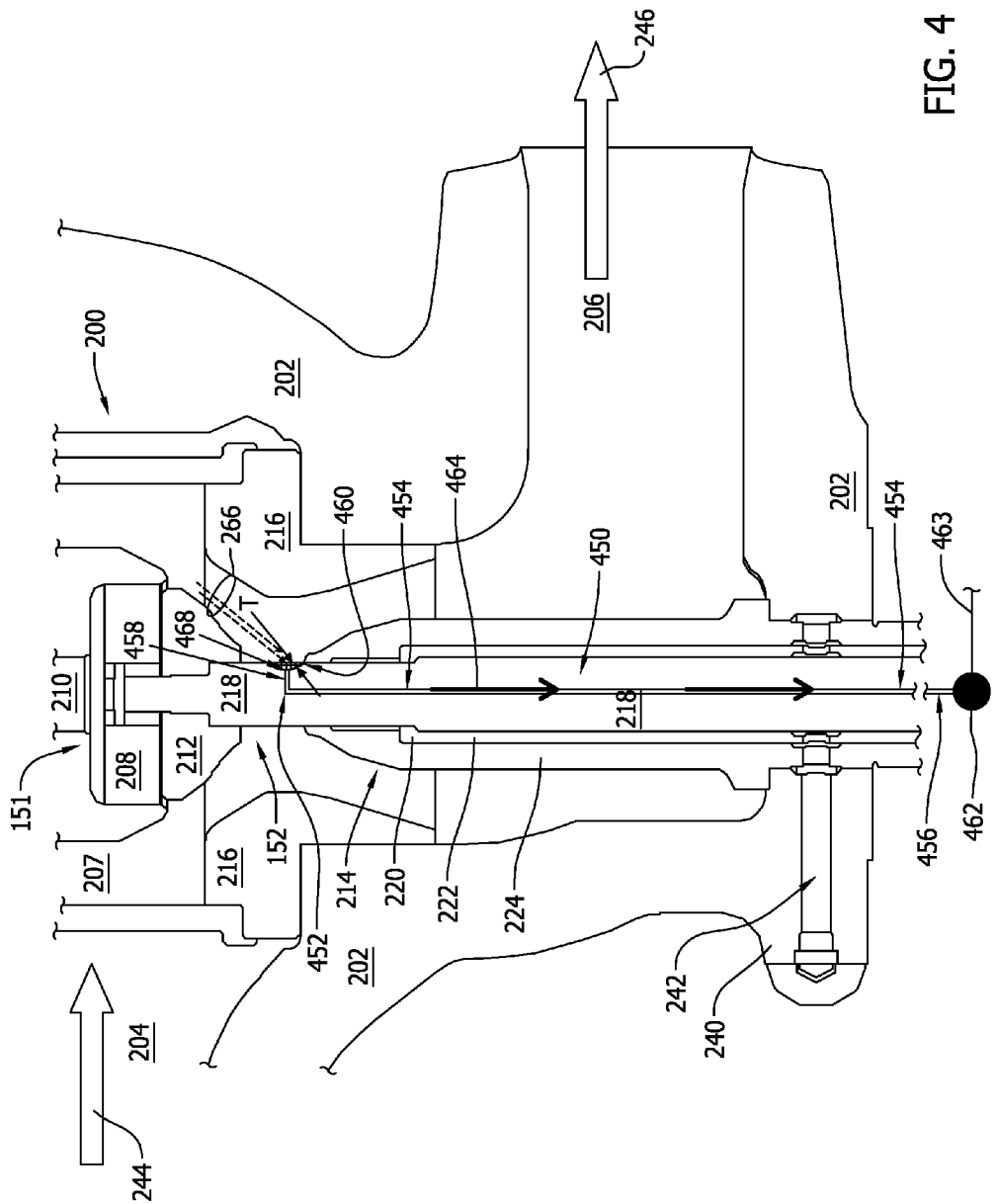
FIG. 4 is a schematic view of the combined steam turbine stop and control valve shown in FIG. 2 with yet another exemplary alternative valve monitoring system.

FIG. 4 is a schematic view of combined steam turbine stop and control valve 200 with yet another exemplary alternative valve monitoring system 450. In some alternative embodiments, combined steam turbine stop and control valve 200 does not include a bushing 222. In such embodiments, pressure seal head 224 is radially extended toward valve stem outer surface 228 to define steam passage 234 therebetween.

System 450 is similar to system 250 (shown in FIG. 2) and system 350 (shown in FIG. 3). However, in this alternative exemplary embodiment, system 450 has an alternative machined passage 452. In this alternative exemplary embodiment, machined passage 452 includes a first portion 454 drilled straight through valve stem 218. Also, in system 450, first portion 454 of passage 452 defines a first opening 456 proximate to an alternative sensing device 462. Sensing device 462 is positioned external to valve stem 218, wherein sensing device 462 is a pressure sensor or any other type of sensor that enables operation of valve monitoring system 450 as described herein. Sensing device 462 is coupled to a processing device, e.g., controller 174 (shown in FIG. 1) via a channel 463 to facilitate monitoring steam leakage 464 within valve stem 218.

Also, in this alternative exemplary embodiment, system 450 includes a second portion 458 of passage 452 that is also drilled through valve stem 218. First portion 454 and second portion 458 are coupled in flow communication and are oriented substantially orthogonal to each other. Alternatively, first portion 454 and second portion 458 have any orientation within valve stem 218 and to each other that enables operation of valve monitoring system 450 as described herein. Also, machined passage 452 has any interior dimensions, e.g., without limitation, lengths and diameters, that enable operation of valve monitoring system 450 as described herein.

Further, in this alternative exemplary embodiment, machined passage 452 is drilled such that a predetermined thickness T of valve stem wall outer surface 228 is maintained. Alternatively, machined passage 452 may be drilled to extend through outer surface 228 of valve stem 218 to define second opening 468 proximate to an alternative erosion site 460, wherein erosion site 460 is positioned on valve stem wall outer surface 228. In such alternative embodiments, material is replaced to close second opening 468 and define thickness T within outer surface 228 via methods that include, without limitation, brazing, seal-welding, and plug insertion. Thickness T has any value that enables operation of valve monitoring system 450 as described herein. Erosion site 460 is oriented and configured to erode within a predetermined range of erosion rates for a predetermined range of solid particle concentrations in the fluid channeled through combined steam turbine stop and control valve 200.

Operation of valve monitoring system 450 is similar to operation of system 250 with the exception that once sufficient material is removed such that the value of thickness T approaches zero, a second opening 468 is defined at second portion 458 of machined passage 452 at erosion site 460. Machined passage 452 is pressurized with steam and steam leakage 464 is channeled to sensing device 462 through second opening 468, machined passage 452, and first opening 456. As machined passage 452 fills with steam 464 and pressure at first opening 456 equalizes with steam pressure at second opening 468, steam flow decreases within passage 452. A signal (not shown) representative of an increase in steam within machined passage 452 is transmitted through channel 463 such that an alarm and/or warning indication (not shown) is annunciated to an operator (not shown). Therefore, a maintenance work order to inspect and/or repair combined steam turbine stop and control valve 200 may be generated.

Figure 5:
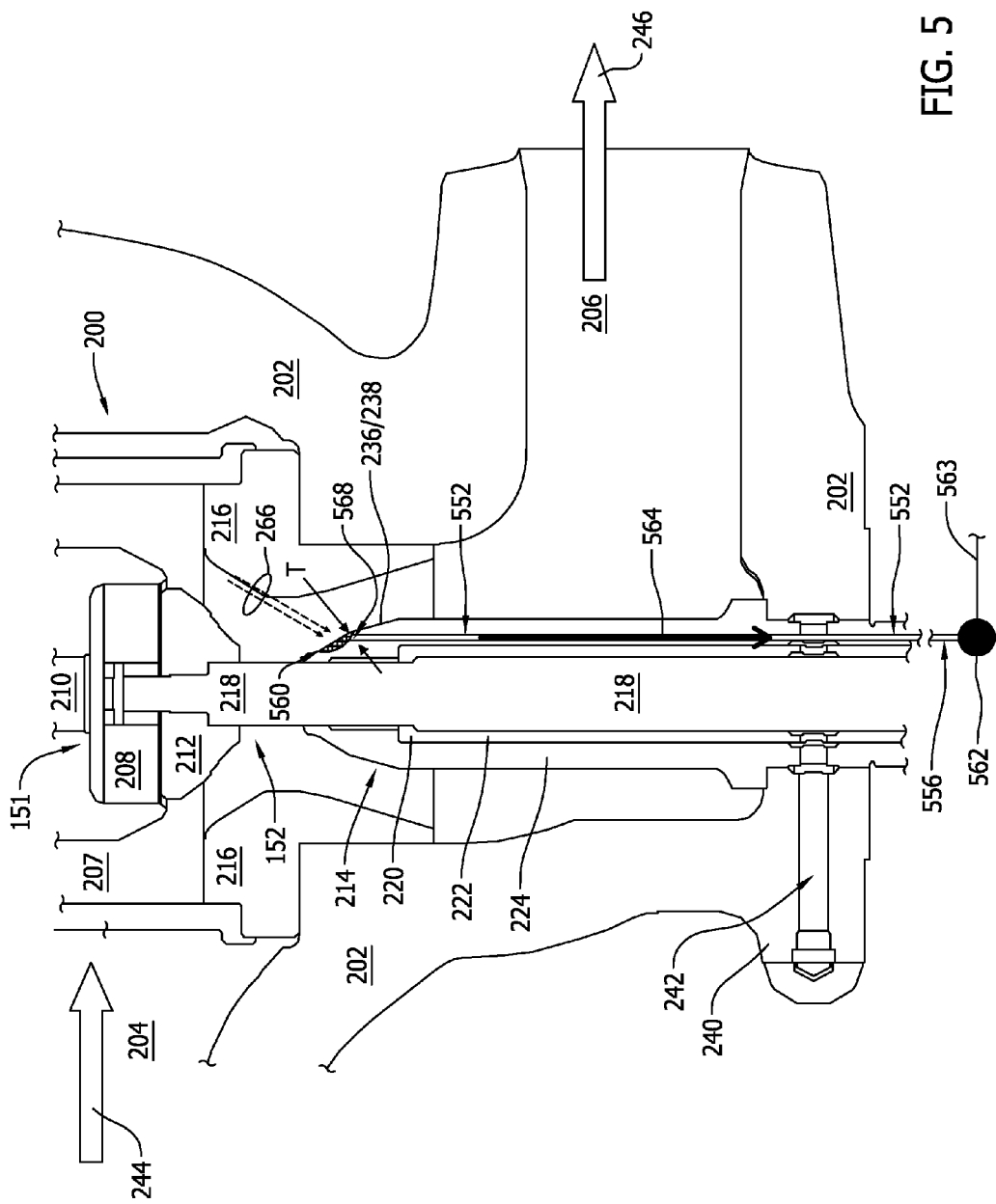
FIG. 5 is a schematic view of the combined steam turbine stop and control valve shown in FIG. 2 with yet another exemplary alternative valve monitoring system.

FIG. 5 is a schematic view of combined steam turbine stop and control valve 200 with yet another exemplary alternative valve monitoring system 550. In some alternative embodiments, combined steam turbine stop and control valve 200 does not include a bushing 222. In such embodiments, pressure seal head 224 is radially extended toward valve stem outer surface 228 to define steam passage 234 therebetween.

System 550 is similar to system 250 (shown in FIG. 2), system 350 (shown in FIG. 3), and system 450 (shown in FIG. 4). However, in this alternative exemplary embodiment, system 550 has an alternative machined passage 552. In this alternative exemplary embodiment, machined passage 552 includes a substantially straight passage drilled straight through pressure seal head 224. Alternatively, machined passage 552 has any orientation within pressure seal head 224 that enables operation of valve monitoring system 550 as described herein. Also, machined passage 552 has any interior dimensions, e.g., without limitation, lengths and diameters, that enable operation of valve monitoring system 550 as described herein.

Also, in system 550, passage 552 defines a first opening 556 proximate to an alternative sensing device 562. Sensing device 562 is positioned external to valve stem 218, wherein sensing device 562 is a pressure sensor or any other type of sensor that enables operation of valve monitoring system 550 as described herein. Sensing device 562 is coupled to a processing device, e.g., controller 174 (shown in FIG. 1) via a channel 563 to facilitate monitoring steam leakage 564 within pressure seal head 224.

Further, in this alternative exemplary embodiment, machined passage 552 is drilled such that a predetermined thickness T of pressure seal head wall outer surface 238 is maintained. Alternatively, machined passage 552 may be drilled to extend through outer surface 238 of pressure seal head 224 to define second opening 568 proximate to an alternative erosion site 560, wherein erosion site 560 is positioned on pressure seal head wall outer surface 238. In such alternative embodiments, material is replaced to close second opening 568 and define thickness T within outer surface 238 via methods that include, without limitation, brazing, seal-welding, and plug insertion. Thickness T has any value that enables operation of valve monitoring system 550 as described herein. Erosion site 560 is oriented and configured to erode within a predetermined range of erosion rates for a predetermined range of solid particle concentrations in the fluid channeled through combined steam turbine stop and control valve 200.

Operation of valve monitoring system 550 is similar to operation of system 250 with the exception that once sufficient material is removed such that the value of thickness T approaches zero, a second opening 568 is defined at erosion site 560. Machined passage 552 is pressurized with steam and steam leakage 564 is channeled to sensing device 562 through second opening 568, machined passage 552, and first opening 556. As machined passage 552 fills with steam 564 and pressure at first opening 556 equalizes with steam pressure at second opening 568, steam flow decreases within passage 552. A signal (not shown) representative of an increase in steam within machined passage 552 is transmitted through channel 563 such that an alarm and/or warning indication (not shown) is annunciated to an operator (not shown). Therefore, a maintenance work order to inspect and/or repair combined steam turbine stop and control valve 200 may be generated.

In contrast to known valve monitoring systems and methods, the valve monitoring systems and methods as described herein facilitate improving detection of valve stem erosion during operation of a fluid system without having to remove the system from service and physically disassembling the valve to visually inspect the stem for erosion. Specifically, in contrast to known valve monitoring systems and methods, the valve monitoring systems and methods described herein include machining passages within portions of stop and control valves for steam turbines. Also, in contrast to known valve monitoring systems and methods, the valve monitoring systems and methods described herein include strategically positioned erosion sites that are oriented and configured to erode within a predetermined range of erosion rates for a predetermined range of solid particle concentrations in the fluid channeled through the steam valves. Further, in contrast to known valve monitoring systems and methods, the valve monitoring systems and methods described herein include sensing devices to alert an operator of stem erosion to facilitate advance planning for replacement or repair of the valve stem and other eroded components within normally scheduled plant outages.

Described herein are exemplary embodiments of valve monitoring systems that facilitate improved commercial operation over that of known valve monitoring systems. The above-described methods, apparatus, and systems facilitate reducing unplanned outages. Such methods, apparatus, and systems also facilitate reducing unnecessary valve disassembly and inspections as compared to known valve monitoring systems. Specifically, the above-described methods, apparatus, and systems enable early detection of increasing levels of valve stem erosion in steam valves prior to stem failure, thereby increasing a margin to safe operation with respect to potential turbine overspeed events. Also, specifically, the above-described methods, apparatus, and systems provide a method to detect increasing levels of valve stem erosion prior to valve stem failure and facilitate advance planning for replacement or repair within normally scheduled plant outages, thereby decreasing unplanned outages due to equipment failure.

An exemplary technical effect of the methods, systems, and apparatus described herein includes at least one of (a) decreasing unnecessary steam valve disassembly, inspection, and reassembly; and (b) alerting operators of possible steam turbine valve stem erosion while the steam turbine is in service.

The methods, apparatus, and systems described herein are not limited to the specific embodiments described herein. For example, components of each system and/or steps of each method may be used and/or practiced independently and separately from other components and/or steps described herein. In addition, each component and/or step may also be used and/or practiced with other assemblies and methods.

While the invention has been described in terms of various specific embodiments, those skilled in the art will recognize that the invention can be practiced with modification within the spirit and scope of the claims.

What is claimed is:

1. A valve comprising:
   a valve stem assembly comprising at least one wall and at least one passage at least partially defined within said valve stem assembly, said at least one passage defines a first opening,
   wherein at least one portion of said at least one wall defines an erosion site that is configured to undergo contact with solid particles such that a second opening of said passage is defined,
   wherein said valve stem assembly comprises a valve stem defining an outer surface thereon and at least one valve stem enclosure device at least partially extending about said valve stem, and
   wherein said at least one passage is drilled within at least one of said valve stem and said at least one valve stem enclosure device, wherein said at least one erosion site comprises at least one of: (i) a remaining portion of at least one of said valve stem and said at least one valve stem enclosure device that has not been removed by drilling, and (ii) a replacement material deposited at said at least one erosion site; and
   at least one sensing device coupled in flow communication with said at least one passage through said first opening, said at least one sensing device is configured to transmit a signal representative of an increased fluid flow through said at least one passage.

2. The valve in accordance with claim 1, wherein said at least one passage comprises:
   a first passage defined within said at least one valve stem enclosure device; and
   a second passage defined between said valve stem and said at least one valve stem enclosure device, wherein said second passage is coupled in flow communication with said first passage and said at least one sensing device.

3. The valve in accordance with claim 1, wherein said at least one passage comprises:
   a first passage defined within said valve stem; and
   a second passage defined between said valve stem and said at least one valve stem enclosure device, wherein said second passage is coupled in flow communication with said first passage and said at least one sensing device.

4. The valve in accordance with claim 1, wherein said at least one passage comprises a passage defined within said valve stem, said passage coupled in flow communication with said at least one sensing device.

5. The valve in accordance with claim 1, wherein said at least one sensing device comprises at least one of a pressure sensor and a fluid flow sensor.

6. The valve in accordance with claim 1, wherein said erosion site comprises a predetermined wall thickness, wherein said erosion site is oriented and configured to erode within a predetermined range of erosion rates for a predetermined range of solid particle concentrations in a fluid channeled through said valve, wherein at least a portion of the fluid is channeled to said at least one sensing device when the thickness of at least a portion of said at least one erosion site is approximately zero.

7. A fluid system comprising:
   at least one fluid source;
   at least one valve coupled in flow communication with said at least one fluid source, said at least one valve comprising a valve stem assembly comprising at least one wall, wherein said valve stem assembly comprises at least one of: a valve stem defining an outer surface thereon and at least one valve stem enclosure device at least partially extending about said valve stem; and
   a valve monitoring system comprising:
      at least a portion of said at least one wall;
      at least one passage at least partially defined within said valve stem assembly, wherein said at least one passage defines a first opening, said at least one passage is drilled within at least one of said valve stem and said at least one valve stem enclosure device; and at least one sensing device coupled in flow communication with said at least one passage through said first opening, said at least one sensing device is configured to transmit a signal representative of an increased fluid flow through said at least one passage, wherein said at least a portion of said at least one wall defines an erosion site that is configured to undergo contact with solid particles such that a second opening of said passage is defined, wherein said at least one erosion site comprises at least one of: (i) a remaining portion of at least one of said valve stem and said at least one valve stem enclosure device that has not been removed by drilling, and (ii) a replacement material deposited at said at least one erosion site.

8. The fluid system in accordance with claim 7, wherein said at least one passage comprises:
a first passage defined within said at least one valve stem enclosure device; and
a second passage defined between said valve stem and said at least one valve stem enclosure device, wherein said second passage is coupled in flow communication with said first passage and said at least one sensing device.

9. The fluid system in accordance with claim 7, wherein said at least one passage comprises:
a first passage defined within said valve stem; and
a second passage defined between said valve stem and said at least one valve stem enclosure device, wherein said second passage is coupled in flow communication with said first passage and said at least one sensing device.

10. The fluid system in accordance with claim 7, wherein said at least one passage comprises a passage defined within said valve stem, said passage coupled in flow communication with said at least one sensing device.

11. The fluid system in accordance with claim 7, wherein said erosion site comprises a predetermined wall thickness, wherein said erosion site is oriented and configured to erode within a predetermined range of erosion rates for a predetermined range of solid particle concentrations in a fluid channeled through said valve, wherein at least a portion of the fluid is channeled to said at least one sensing device when the thickness of at least a portion of said at least one erosion site is approximately zero.

12. A method of operating a fluid system, said method comprising:
channeling a fluid from a fluid source to a valve, the fluid includes entrained particles, the valve includes a valve stem assembly, wherein the valve stem assembly comprises at least one of: a valve stem defining an outer surface thereon and a valve stem enclosure device at least partially extending about the valve stem;
impinging the fluid with the entrained particles against at least a portion of the valve stem assembly;
eroding the at least a portion of the valve stem assembly and exposing a passage that extends through the valve stem assembly to the fluid by eroding a portion of an erosion site that includes a wall of one of the valve stem and the valve stem enclosure device, wherein the passage is drilled within at least one of the valve stem and the valve stem enclosure device, and wherein the erosion site comprises at least one of: (i) a remaining portion of at least one of the valve stem and the valve stem enclosure device that has not been removed by drilling, and (ii) a replacement material deposited at the erosion site;
channeling a portion of the fluid through the passage and contacting a sensing device; and
transmitting a signal from the sensing device representative of increased fluid flow through the passage.

13. The method in accordance with claim 12, wherein the erosion site has a predetermined thickness.

14. The method in accordance with claim 12, wherein channeling a portion of the fluid through the passage and contacting a sensing device comprises:
channeling the fluid through a first passage defined within a valve stem enclosure device, wherein the valve stem enclosure device extends about at least a portion of a valve stem; and
channeling the fluid through a second passage defined between the valve stem enclosure device and the valve stem, wherein the second passage is coupled in flow communication with the first passage and the sensing device.

15. The method in accordance with claim 12, wherein channeling a portion of the fluid through the passage and contacting a sensing device comprises:
channeling the fluid through a first passage defined within a valve stem; and
channeling the fluid through a second passage defined between a valve stem enclosure device, wherein the a valve stem enclosure device at least partially extends about the valve stem, wherein the second passage is coupled in flow communication with the first passage and the sensing device.

16. The method in accordance with claim 12, wherein channeling a portion of the fluid through the passage and contacting a sensing device comprises channeling the fluid through a passage defined within a valve stem and the passage coupled in flow communication with the sensing device.

* * * * *

UNITED STATES PATENT AND TRADEMARK OFFICE
CERTIFICATE OF CORRECTION

PATENT NO. : 8,985,143 B2  
APPLICATION NO. : 13/566055  
DATED : March 24, 2015  
INVENTOR(S) : Forte, Jr. et al.

Page 1 of 1

It is certified that error appears in the above-identified patent and that said Letters Patent is hereby corrected as shown below:

On the Title Page, in item (73), in Assignee, delete "ELectric" and insert therefor
-- Electric --.

Signed and Sealed this
Twenty-sixth Day of January, 2016

Michelle K. Lee
*Director of the United States Patent and Trademark Office*